United States Patent [19]

Henry

[11] Patent Number: 4,460,028

[45] Date of Patent: Jul. 17, 1984

[54] LOG HANDLING DEVICE AND METHOD THEREFOR

[76] Inventor: Richard T. Henry, 1102 Kelly Rd., Bellingham, Wash. 98226

[21] Appl. No.: 484,199

[22] Filed: Apr. 12, 1983

[51] Int. Cl.³ .............................................. B27L 7/00
[52] U.S. Cl. .................................... 144/366; 24/16 R; 24/68 CT; 24/69 T; 144/193 R; 269/131; 269/254 R
[58] Field of Search .................... D12/123; 59/78, 79, 59/93; 24/16 R, 17 R, 17 A, 17 B, 68 CT, 68 T, 69 T, 69 WT, 71 ST; 269/130, 131, 254 R; 144/193 R, 366

[56] References Cited

U.S. PATENT DOCUMENTS

| 2,638,647 | 5/1953 | Nielsen | 24/68 CT |
|---|---|---|---|
| 2,759,235 | 8/1956 | Rea | 24/68 CT |
| 2,824,717 | 2/1958 | Yeager | 24/68 CT |
| 3,119,160 | 1/1964 | Hoppeler | 24/16 R |
| 3,504,404 | 4/1970 | Rehnstrom et al. | 24/16 R |
| 3,669,439 | 6/1972 | Sanchez | 269/130 |
| 4,211,389 | 7/1980 | Fray et al. | 24/68 CT |

Primary Examiner—W. D. Bray
Attorney, Agent, or Firm—Hughes, Barnard & Cassidy

[57] ABSTRACT

A log handling device for biased, adjustable circumferential envelopment of a log during a splitting operation to maintain the general conformation thereof as the same is reduced to a plurality of split elements and provide an ability to grasp the log, whether whole or split, is disclosed herein.

14 Claims, 5 Drawing Figures

U.S. Patent    Jul. 17, 1984    Sheet 1 of 2    4,460,028
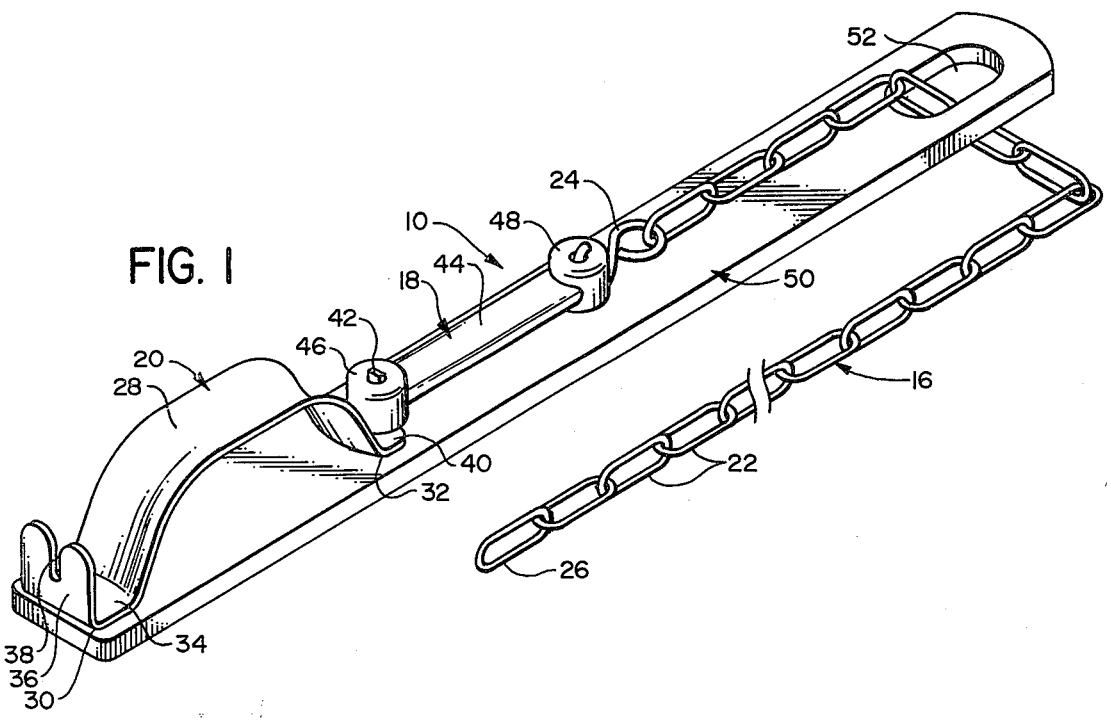
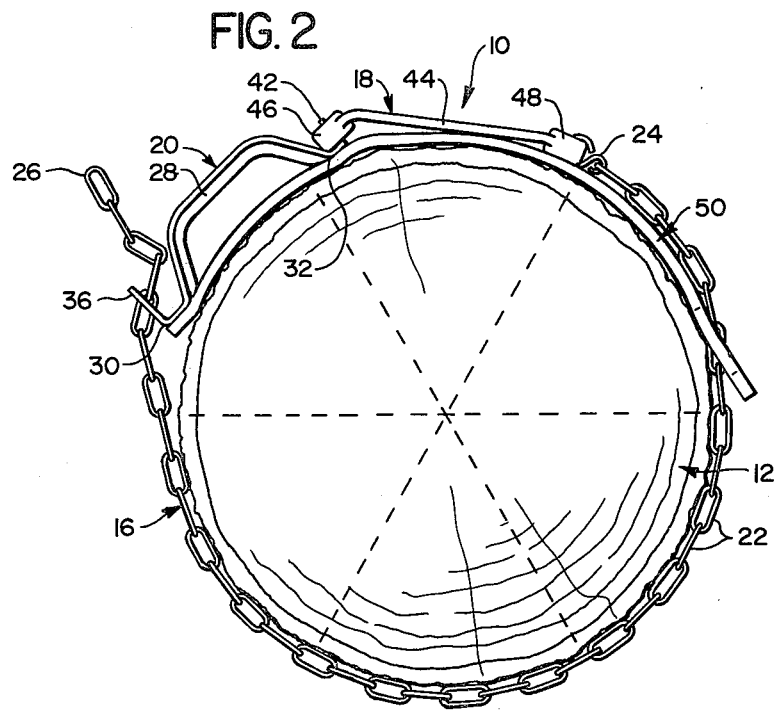

LOG HANDLING DEVICE AND METHOD THEREFOR

BACKGROUND OF THE INVENTION

1. Field of the Invention

The present invention relates generally to log handling devices and, more especially, to a log handling device which serves to maintain the general conformation of a log during a splitting operation and also to carry a log wether whole or split. The present invention further relates to a method for conducting a splitting operation on a log, such as a fireplace log, employing the instant device and thereby maintaining the general conformation of the log once split to a plurality of segments.

2. Description of the Background Art

Recently there has been a resurgence in the interest and popularity of burning wood, for example as a fuel source to augment conventional heating systems or oftentimes simply for aesthetic reasons. The process of generating firewood for these purposes can be a considerable labor, taking into account the need to saw logs, split them, and then carry the split logs either to a stack or the proximity where the same will be burned.

The splitting operation itself conventionally entails striking the end grain of a sawn log with an axe, maul, or wedge/hammer combination and oftentimes, depending upon the diameter of the log, the process is repeated several times to provide firewood of the appropriate fractional size for burning. Two particular aspects of this task are specifically addressed by the instant invention. Conventional splitting yields a number of scattered pieces of wood falling or sometimes flying apart as the log is divided. Apart from the obvious safety hazard of flying pieces of wood, more often than not one is required to position and reposition the log relative to those pieces removed during the splitting operation in order to continue the task at hand. Second, once the log is split into several pieces, they must be gathered and carried.

As particularly respects these two facets of wood splitting, the prior art recognizes certain approaches facilitating one or the other. For example, U.S. Pat. No. 1,307,714 discloses a wood sawing and splitting machine wherein a chain is placed around a log and a splitter is dropped onto it. The holding chain is secured by spring members to a surrounding frame and holds the log while it is being split. On the other hand, there are various types of devices for carrying logs, bundles of sticks, or split pieces of firewood, as typified, for example, by U.S. Pat. Nos. 3,119,160 and 4,223,818.

While the approaches noted above are each generally efficient within the individual context of binding a log during splitting or transporting split firewood, there is a certain lack of versatility when the entire splitting operation is considered as a whole. Furthermore, depending upon the sizes of logs to be split, it may sometimes be convenient or desirable to envelop two or more logs, split them and carry those split, multiple logs. Accordingly, the need exists to provide a more widely adaptable device which takes into account the vagaries of log splitting tasks.

SUMMARY OF THE INVENTION

The present invention advantageously provides a log handling device for circumferentially enveloping one or more logs to be split, maintaining the general conformation thereof during the splitting operation, and providing a means for grasping and carrying the log(s) once that operation is concluded. The log handling device of the present invention is particularly desirable for its simplicity of construction yet durability and efficiency in use. Still a further advantage is the ability of the log handling device of the present invention to accommodate a very wide range of log diameters while yet providing the aforementioned benefits. The advantage of circumferential envelopment during splitting and maintenance of the general conformation of the log not only guards against the danger of flying pieces of wood but allows one to split an entire log without the need to collect, move, or otherwise manipulate those individuals pieces generated upon the division of the larger member. Furthermore, since the conformation is maintained, the log is more easily transported then would be the case were the several individual elements to require collection as the split pieces retain the most desirable orientation vis-a-vis one another since there is very little relative movement during the operation.

The foregoing, and other, advantages of the present invention are realized in one aspect thereof by a log handling device for biased, adjustable circumferential envelopment of the log to maintain its conformation both during a log splitting operation, and the subsequent carrying thereof. The log handling device of the present invention is preferably comprised of envelopment means for encircling the log to be split intermediate the length thereof, biasing means for maintaining a circumferential compressive force between the envelopment means and the log and preserving the general conformation thereof during the splitting procedure, and handle means for grasping the envelopment means and manipulating the log during or subsequent to that splitting operation while still preserving the desired conformation. The envelopment means is preferably comprised of a substantially non-extensible envelopment member having proximal and distal ends disposed for cooperative engagement across an intermediate biased juncture; the most preferred embodiment employing a chain as that member. The biased juncture is itself preferably comprised of the biasing means and the handle means, most preferably with the proximal end of the chain or other envelopment member joined to the biasing member and the handle means configured to include a latch member for receiving the chain and securing the same when the device is disposed about a log.

In a most preferred implementation of the present invention, the log handling device further includes a stabilizing contact member, most preferably in the form of a resilient strap having a proximal and a distal end. The handle member is formed with a central section having a generally inverted U-shaped configuration and including first and second upturned ends. The handle is secured at or near the proximal end of the strap, for example by means of rivets or the like. A first upturned is provided with a notch or similar shape to serve as the latch means for receipt and retention of a selected one of the links constituting the envelopment chain. The second end of the handle includes a post for receiving one end of the biasing means. In this instance, the biasing means is an elastomer having enlarged or reinforced ends, the one received on the post of the handle member and the other joining the proximal end of the chain thereto. The chain or envelopment member thence progresses to and through an aperture formed in the strap at or near the distal end thereof. The strap, possessing some flexible resiliency in this embodiment, facilitates the placement of the log handler about the log in part by presenting the chain more conveniently than were it simply a free member and, during any subsequent manipulation of the log, allows for some twisting flexure at or about the handle member.

In an alternate, but nonetheless highly preferred embodiment, the biased juncture is further comprised of an overcenter lever disposed intermediate the biasing means and the handle means. In this event, with the lever moved to its open position prior to securing the chain or other envelopment means about a log or logs to be split, and the biasing means distended to an extent comfortable for the user, additional constriction or biasing force may then be applied by movement of the lever overcenter to a closed configuration. This lever action therefore materially assists in the application of a greater circumferential envelopment force than might otherwise be achievable due to the mechanical advantage of this element.

Splitting and carrying a split log are both facilitated by utilization of the instant log handler. The envelopment member is disposed about the girth of the log to be split, located intermediate its length and preferably near the center, the e.g., chain is then pulled slightly against the resistance of the biasing member and thence latched by inserting one of the chain links through the notch on the handle. In those instances where the optional but preferable overcenter lever is included, its manipulation as aforesaid assists in the development of somewhat greater envelopment forces or allows the same level of force to be applied with greater convenience. Regardless, the biasing member provides a suitable compressive or restraining force which serves both to maintain positive interengagement between the log handler and log to be split and to maintain the general conformation of the log during the subsequent splitting technique. The log may then be split in any convenient manner while the pieces remain bound together. Following that, the log may be carried as need be simply by grasping via the handle.

Other advantages of the present invention, and a fuller appreciation of its construction and mode of operation, will be gained upon an examination of the following detailed description taken in conjunction with the figures of drawing, wherein:

BRIEF DESCRIPTION OF THE DRAWINGS

FIG. 1 is an isometric view of a log handling device in accordance with the present invention;

FIG. 2 is a top plan view of a log, enveloped by the log handling device of FIG. 1 and showing in phantom lines those locations where the log is to be split;

DETAILED DESCRIPTION OF THE INVENTION

The present invention relates, generally, to log handling devices and, more especially, to an improved log handling device which serves to maintain the general conformation of a log both during a splitting operation and during any subsequent carrying of the split log. Accordingly, the invention will now be described with reference to certain preferred embodiments within the aforementioned context; albeit those skilled in the art will appreciate that such a description is meant to be exemplary only and should not be deemed limitative.

Figure 3:
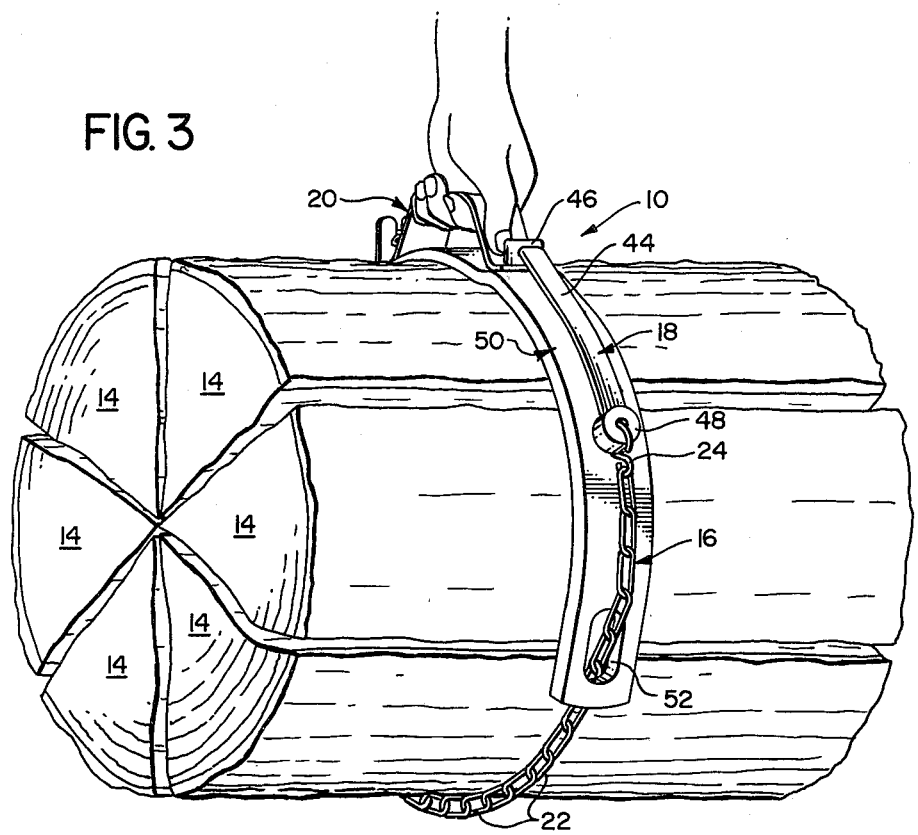
FIG. 3 is an isometric view showing the log of FIG. 2 following the splitting operation being carried while enveloped by the device of the present invention.

Turning to the figures of drawing, in all of which like parts are identified with like reference numerals, a log handling device in accordance with the present invention, designated generally as 10, is shown to be circumferentially enveloping a log designated generally as 12, in preparation for a splitting operation as shown in FIG. 2 and subsequent to that operation where the log has been divided into a plurality of segments 14 as shown in FIG. 3. The log handler 10 is comprised of an envelopment means designated as 16, for encircling the log to be split, a biasing means 18 for maintaining a circumferential compressive force between the envelopment means 16 and the log 12 in order to preserve the general conformation of the latter both during and after a splitting operation, and a handle means 20 facilitating both manipulation and transportation of the log.

The envelopment means 16 is comprised of a substantially non-extensible envelopment member, in this case shown to be a chain having a plurality of links 22. The chain or envelopment member has a proximal end 24 and a distal end 26 disposed for cooperative engagement across and intermediate biased juncture. In the preferred embodiment shown, and best viewed in FIG. 1, the biased juncture itself is comprised of the handle means and the biasing means disposed seriatim for ultimate force linkage through the chain when the same encircles the log 12 as shown in either FIGS. 2 or 3. In this preferred implementation, the handle means 20 is preferably formed for multifunctionality. More specifically, the same includes a central section having a generally inverted U-shaped configuration to serve as a grip, and a first upturned end 30 and a second upturned end 32 to serve as points of attachment for the cooperative envelopment and biasing means and ultimate for force linkage when the device is in use. The upturned end 30 includes a flat element 34 merging to an upstanding lip or edge 36. The latter is formed with a notch 38 configured for receipt of a selected one of the links 22 as best viewed in FIGS. 2 and 3; the notch and links thereby serving as an adjustment means in order that the log handler 10 may accommodate logs of varying diameters simply by suitable selection of an appropriate link on the chain for disposition within the notch. The upturned 32 likewise includes a flat element 40 which merges to an upstanding post 42. The post 42 thereby presents a convenient point of attachment for the biasing means 18. In the illustrated embodiment, that biasing means is most preferably comprised of an elastomeric member having a center section 44 and reinforced or enlarged ends 46 and 48 each including an aperture therein. The enlarged end 46 is disposed over and in cooperative engagement with the upstanding post 42 which preferably has a width or thickness dimension slightly greater than that of the aperture of the end 46 so that the same may be press fitted together. The other end of the elastomeric biasing member receives the proximal end 24 of the chain or envelopment member. Consequently, force transmission through the log handling device is from the proximal end 24 of the chain (or other envelopment member selected—e.g, line) through that portion of the chain required to encircle the log 12 up to the latch formed by the upstanding edge 36 and thence across the biased juncture comprised of the handle 20 and biasing means 18.

In the illustrated embodiment, the log handling device 10 further includes a stabilizing contact member designated generally as 50. The contact member 50 is most preferably formed from a resilient polymer in the shape of a strap or web. The strap serves to support both the biased juncture comprised of the handle and biasing member and also to provide some manipulative integrity to the chain facilitating its placement about the log 12. This objective is further served by sizing the strap 50 to be on the order of about twice the length of the biased juncture and providing the distal end thereof with an aperture 52 through which the chain may pass. When the device 10 is grasped in preparation for its attachment about the log 12, the chain will then dangle freely from the end of the web and be presented much more conveniently to the user in accomplishing that task. When the log is manipulated or the split log carried, the web serves some additional purposes as well. It is to be anticipated that grasping the log handler 10 when it is enveloping either a log or a split log that there will be some tendency for twisting or flexure about the handle member. The resilience of the web serves to absorb in part and distribute this twisting through its own flexure and intimate contact about at least a portion of the periphery of the log. Furthermore, when the user grasps the device by means of the grip of handle 20, as shown in FIG. 3, the user's hand is isolated from the rough bark and padded against the same by means of that portion of the web beneath the handle. In the most preferred embodiment shown, the handle 20 is fastened to the web 50 at the two generally flat regions 34 and 40, for example by means of rivets or the like, which tends to stiffen somewhat that proximal region of the web which is subjected to the greatest twisting force during long handling or carrying, further stabilizing the device for log manipulation. Still further, in the most preferred embodiment of the present invention, the biasing means 18 is fabricated from a polymer known as EPDM, which has poor cut and abrasion resistance. The strap is most preferably fabricated from polyurethane which has better properties in those regards. Accordingly, the strap will tend to protect the biasing member when the same is in use, including some protection against cutting in the event the user misses the log and strikes the device.

Figure 4:
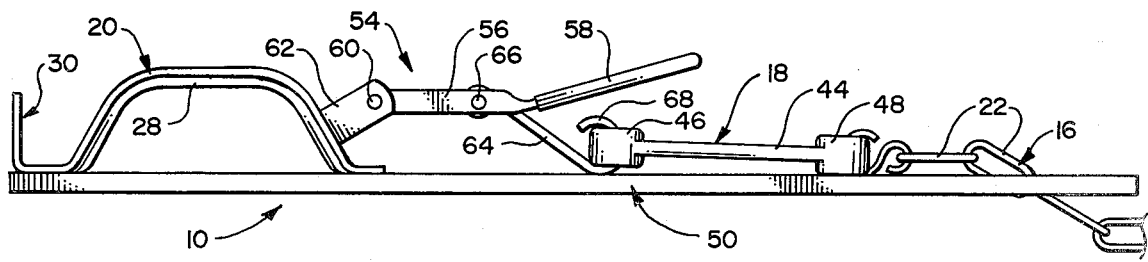
FIG. 4 is a partially fragmentary, side elevation view of an alternate embodiment of a log handling device in accordance with the present invention, incorporating a lever for assisting in the development of compressive envelopment force about a log to be split, shown with the lever in an open position; and, FIG. 5 is a view, similar to FIG. 4, but showing the lever in a closed position.
Figure 5:
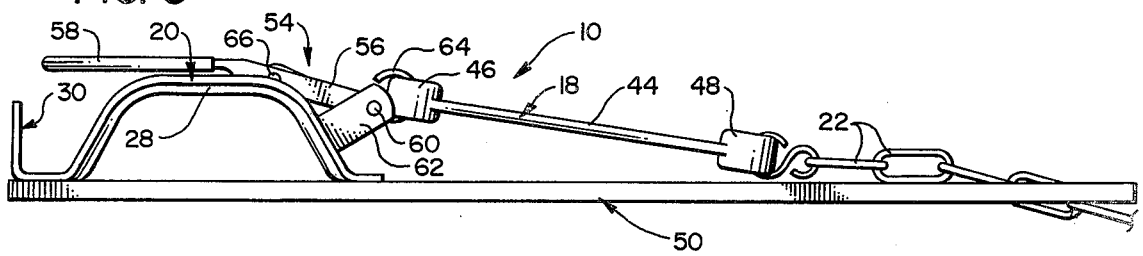

In some instances the user may find it difficult to tension the biasing member sufficiently in the application of the log handling device to provide a sufficient envelopment force. For example, an adolescent may not have sufficient strength to pretension the biasing member. In other instances, it may be more convenient simply to secure the envelopment member of the device and then apply the circumferential constriction force. For example, it is envisioned that the log handler 10 may be employed to secure two or three or more logs of relatively smaller sizes, split those several logs and then carry them away. Stretching the biasing member and wrapping the device about plurality of logs may not be deemed as convenient as simply securing the envelopment member and then establishing the appropriate biasing force. FIGS. 4 and 5 illustrate an alternate but highly preferred embodiment which achieves these aims.

Turning to FIGS. 4 and 5, wherein like parts as respects the embodiment discussed above are identified with like reference numerals, the log handling device 10 further incorporates an overcenter lever designated generally as 54 disposed intermediate the biasing means 18 and the handle 20. The upturned end 32 is modified somewhat by elimination of the post 42, with the lever 54 preferably depending from the side of the grip 28. In the illustrated embodiment, the overcenter lever is comprised of an arm 56 having a first end terminating in a lever handle 58. The other end of the arm 56 is pivotally joined about an axle 60 to a bracket 62 joined to the grip 28. In this preferred embodiment, the bracket 62 is a generally U-shaped bracket and the end of arm 56 mating therewith is also preferably flared into a generally U-shape having a transverse dimension only slightly less than the inner transverse dimension of the U-bracket 62. Thus, in this most preferred embodiment, the axle means 60 are comprised of rivets disposed through mating apertures in each of the U-shaped elements; albeit, a linear leg supported on a post serving as that axle means might equally well be employed. A link 64 depends from the arm 56 about a pivot or axle 66. When the preferred configuration noted above is employed, wherein the arm 56 flares to a U-shaped, the link 64 is easily and preferably retained within a throat where the arm begins to flare and the pivot is conveniently provided by a threaded fixture means disposed through the link 64. The link terminates in a hook 68 for disposition through the reinforced or bulbous end 46 of the biasing member 18.

The overcenter lever 54 allows one to apply a greater biasing force circumferentially about the log 12 or a plurality of logs should it be desired to secure several smaller ones together than might otherwise be the case as respects the embodiment of FIGS. 1-3. One may apply the log handler 10 to the log(s) in precisely the same way as in the case of the previous embodiment, with the lever 54 in the disposition shown in FIG. 4. Movement of the lever handle 58 pivots the arm 56 about the axle means 60 to an overcenter position as shown in FIG. 5 and concomitantly draws the link 64 tensioning the biasing member 18.

In use, the log handling device 10 of the present invention is convenient, durable, and reliable. With a sawn log preferably standing upright (on end), the user may grasp the handle 20 allowing the chain or envelopment member 16 to dangle freely from the aperture 52 in the web 50. The chain is then grasped by the user's other hand and the handle and chain drawn together about the log encircling same. Preferably, the free end of the chain and the handle end of the device are wrapped about 180° while the user pulls out tangentially on the strap 50 to reduce friction between the strap and the log. Continuing with a pulling motion distends the biasing means 18 and, in that condition, an appropriate link on the chain or other envelopment member is inserted within the notch 38. That much of the procedure is generally common to both the embodiments of FIGS. 1-3 and FIGS. 4-5, albeit less distension force against the biasing means 18 may sometimes be required in the case of the latter. Regardless, when the embodiment of FIGS. 4 and 5 is the selected one, the procedure then continues with a manipulation of lever 54 to apply yet a greater envelopment force about the log. That leaves the log handler 10 enveloping the log, preferably at or near its center, with a compressive force provided by the biasing member providing cooperative integrity. That log may then be split in any convenient way such as, for example, by means of a maul. Although the force exerted by the log handler 10 is not sufficient to retard the splitting force, it is sufficient to maintain the general conformation of the log as it is divided repetitively as best envisioned with reference to the phantom lines of FIG. 2. The fractional log pieces remain together, there is lesser tendency for the log to tip as it is reduced by the splitting operation, and flying pieces of wood are all but eliminated. When that splitting operation is concluded, the user may then simply grasp the handle means 20, pick up the log as shown in FIG. 3, and carry the same as may be required. Because the log pieces are retained throughout this operation in the same general orientation as the initial log and with the split pieces in the closest possible mating engagement, the manual transportation of the split log is greatly facilitated.

While the invention has now been described with reference to certain preferred embodiments thereof, those skilled in the art will appreciate that various substitutions, modifications, changes and omissions may be made without departing from the spirit thereof. For example, a knotted line or similar envelopment member might well replace the chain illustrated herein; the purpose being the provision of a generally non-extensible envelopment member having means for adjustable securement in cooperation with a latching mechanism to accommodate various sizes of logs. Likewise, the elastomeric member employed for the biasing means might give way to a spring-type arrangement without sacrificing the functional objective to be provided thereby. Accordingly, as the foregoing and other such equivalent structures may be used in lieu of the precise configuration shown herein, it is intended that the scope of the invention be limited solely by that of the claims granted herein.

What is claimed is:

1. A log handling device for biased, adjustable circumferential envelopment of a log during a log splitting operation and for carrying said log, comprising:
  a. envelopment means for encircling a log to be split intermediate the length thereof;
  b. biasing means for maintaining a circumferential compressive force between said envelopment means and said log and preserving the general conformation thereof during a log splitting operation;
  c. handle means for grasping said envelopment means and manipulating said log during or subsequent to said splitting operation while preserving said conformation thereof.

2. The log handling device of claim 1, wherein said envelopment means is comprised of a substantially non-extensible envelopment member having proximal and distal ends disposed for cooperative engagement across an intermediate biased juncture.

3. The log handling device of claim 2, wherein said biased juncture is comprised of said biasing means and said handle means.

4. The log handling device of claim 3, wherein said handle means includes a latch means at a first end thereof for receipt and securement of said envelopment member at said juncture.

5. The log handling device of claim 4, wherein said biasing means bridges the second end of said handle means and the proximal end of said envelopment member.

6. The log handling device of claim 5, wherein said handle means is supported on and secured to a stabilizing contact member having a proximal and a distal end.

7. The log handling device of claim 6, wherein said envelopment member is comprised of a chain and said stabilizing contact member is comprised of a resilient strap having an aperture proximate the distal end thereof through which said chain is disposed.

8. The log handling device of claim 7, wherein said handle means is secured at the proximal end of said resilient strap.

9. The log handling device of claim 8, wherein said biasing means is comprised of a elastomer.

10. The log handling device of claim 1, further comprising adjustment means for said biasing means.

11. The log handling device of claim 3, wherein said biased juncture is further comprised of adjustment means for said biasing means.

12. The log handling device of claim 10, wherein said adjustment means is comprised of an overcenter lever disposed intermediate said biasing means and said handle means.

13. The log handling device of claim 11, wherein said adjustment means is comprised of an overcenter lever disposed intermediate said biasing means and said handle means.

14. A method for handling a log during a log splitting operation thereon, comprising the steps of:
  a. providing a log handling device for biased, adjustable circumferential envelopment of a log during a log splitting operation and for carrying said log thereafter, comprising:
    i. envelopment means for encircling a log to be split intermediate the length thereof;
    ii. biasing means for maintaining a circumferential compressive force between said envelopment means and said log and preserving the general conformation thereof during a log splitting operation;
    iii. handle means for grasping said envelopment means and manipulating said log during or subsequent to said splitting operation while preserving said conformation thereof;
  b. encircling said log with said envelopment means intermediate the length thereof and securing same against the force of said biasing means;
  c. subjecting said log to a log splitting operation; and,
  d. grasping said handle means for manipulation of said split log.

* * * * *